United States Patent
Yamaguchi

(10) Patent No.: US 12,441,349 B2
(45) Date of Patent: Oct. 14, 2025

(54) VEHICLE NOTIFICATION DEVICE

(71) Applicant: TOYOTA JIDOSHA KABUSHIKI KAISHA, Toyota (JP)

(72) Inventor: Akihiro Yamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 18/375,572

(22) Filed: Oct. 2, 2023

(65) Prior Publication Data

US 2024/0174247 A1    May 30, 2024

(30) Foreign Application Priority Data

Nov. 30, 2022   (JP) ................. 2022-191177

(51) Int. Cl.
| | |
|---|---|
| *B60W 50/14* | (2020.01) |
| *B60W 40/09* | (2012.01) |
| *B60W 60/00* | (2020.01) |
| *G06V 20/59* | (2022.01) |

(52) U.S. Cl.
CPC ............ *B60W 50/14* (2013.01); *B60W 40/09* (2013.01); *B60W 60/0053* (2020.02); *G06V 20/597* (2022.01); *B60W 2050/143* (2013.01); *B60W 2050/146* (2013.01); *B60W 2420/403* (2013.01); *B60W 2540/225* (2020.02); *B60W 2540/229* (2020.02); *B60W 2556/10* (2020.02)

(58) Field of Classification Search
CPC .. B60W 50/14; B60W 40/09; B60W 60/0053; B60W 2050/143; B60W 2050/146; B60W 2420/403; B60W 2540/225; B60W 2540/229; B60W 2556/10; G06V 20/597
See application file for complete search history.

(56) References Cited

U.S. PATENT DOCUMENTS

| | | | |
|---|---|---|---|
| 9,805,275 | B2 | 10/2017 | Okuda |
| 10,525,981 | B2 | 1/2020 | Matsumura |
| 10,579,056 | B2 | 3/2020 | Matsumura |
| 10,649,452 | B2 | 5/2020 | Ichikawa et al. |
| 10,706,299 | B2 | 7/2020 | Matsumura |
| 10,814,880 | B2 | 10/2020 | Kishi |
| 10,895,875 | B2 | 1/2021 | Hashimoto et al. |
| 10,915,100 | B2 | 2/2021 | Matsushita et al. |
| 11,173,919 | B2 | 11/2021 | De Weser et al. |
| 2015/0120124 | A1* | 4/2015 | Bartels ............ B60W 50/10 701/23 |

(Continued)

FOREIGN PATENT DOCUMENTS

| | | |
|---|---|---|
| JP | 2018-203006 A | 12/2018 |
| JP | 6831190 B2 | 2/2021 |
| JP | 2022-012356 A | 1/2022 |

*Primary Examiner* — Mohamed Barakat

(74) *Attorney, Agent, or Firm* — Dinsmore & Shohl LLP

(57) ABSTRACT

A vehicle notification device is applied to an automated driving vehicle. The vehicle notification device includes one or more processors. The one or more processors are configured to execute a notification process of notifying a driver of at least eyes-on request out of hands-on request and the eyes-on request every time a notification interval elapses. The one or more processors are also configured to calculate the notification interval based on driving characteristic information of the driver.

4 Claims, 3 Drawing Sheets

(56) References Cited

U.S. PATENT DOCUMENTS

| | | | |
|---|---|---|---|
| 2016/0001781 A1* | 1/2016 | Fung | G07C 9/37 |
| | | | 701/36 |
| 2016/0068103 A1* | 3/2016 | McNew | B60W 50/0097 |
| | | | 701/23 |
| 2018/0046185 A1* | 2/2018 | Sato | G05D 1/0061 |
| 2018/0345967 A1* | 12/2018 | Oniwa | B60K 28/02 |
| 2019/0283774 A1* | 9/2019 | Ishisaka | B60W 60/0051 |
| 2019/0329787 A1* | 10/2019 | Hayashi | G06V 40/172 |
| 2021/0188289 A1* | 6/2021 | Oba | G08G 1/16 |
| 2022/0001874 A1 | 1/2022 | Yoshida | |

* cited by examiner

VEHICLE NOTIFICATION DEVICE

CROSS-REFERENCES TO RELATED APPLICATION

The present disclosure claims priority under 35 U.S.C. § 119 to Japanese Patent Application No. 2022-191177, filed on Nov. 30, 2022, which is incorporated herein by reference in its entirety.

TECHNICAL FIELD

The present disclosure relates to a vehicle notification device applied to an automated driving vehicle.

BACKGROUND

JP 2022-012356 A discloses a driver monitoring system. In this driver monitoring system, when the elapsed time after notification of a hands-on request or a surrounding confirmation request exceeds a judgement reference time, the hands-on request or the surrounding confirmation request is notified again. When a symptom associated with a decrease in the attention of a driver is detected, a warning is given to the driver, and the judgement reference time is set to be shorter than that before the warning is given.

SUMMARY

According to automated driving that enables hands-off and eyes-off, the driver who is released from the driving operation is allowed to perform a secondary activity, which is an action other than the driving operation, during traveling of the vehicle. On the other hand, during the automated driving, the system of the vehicle is required to constantly recognize that the driver can return to the driving operation before a specified time elapses after a driving change request is issued, and to maintain a state (driving preparation state) in which the driver is ready to return to the driving operation as described above.

If an attempt is made to maintain the driving preparation state by constantly monitoring the driver during the automated driving, it may become necessary to limit the secondary activity, or the cost required for monitoring may increase. Therefore, it is desirable to be able to appropriately maintain the driving preparation state without the need to constantly monitor the driver during the automated driving using a monitoring device, such as a driver monitor. Further, it is desirable to prompt the driver to improve his or her driving characteristics by causing the driver to maintain the driving preparation state.

The present disclosure has been made in view of the problem described above, and an object of the present disclosure is to provide a vehicle notification device that can appropriately continue a state in which a driver is ready to return to the driving operation within a specified time during automated driving without constantly monitoring the driver during the automated driving, and can prompt the driver to improve his or her driving characteristics.

A vehicle notification device according to the present disclosure is applied to an automated driving vehicle. The vehicle notification device includes one or more processors. The one or more processors are configured to execute a notification process of notifying a driver of at least eyes-on request out of hands-on request and the eyes-on request every time a notification interval elapses. The one or more processors are also configured to calculate the notification interval based on driving characteristic information of the driver.

According to the present disclosure, it is possible to appropriately continue a state in which a driver is ready to return to the driving operation within a specified time during automated driving without constantly monitoring the driver during the automated driving, and to prompt the driver to improve his or her driving characteristics.

DETAILED DESCRIPTION

1. Configuration Example of Automated Driving Vehicle

Figure 1:
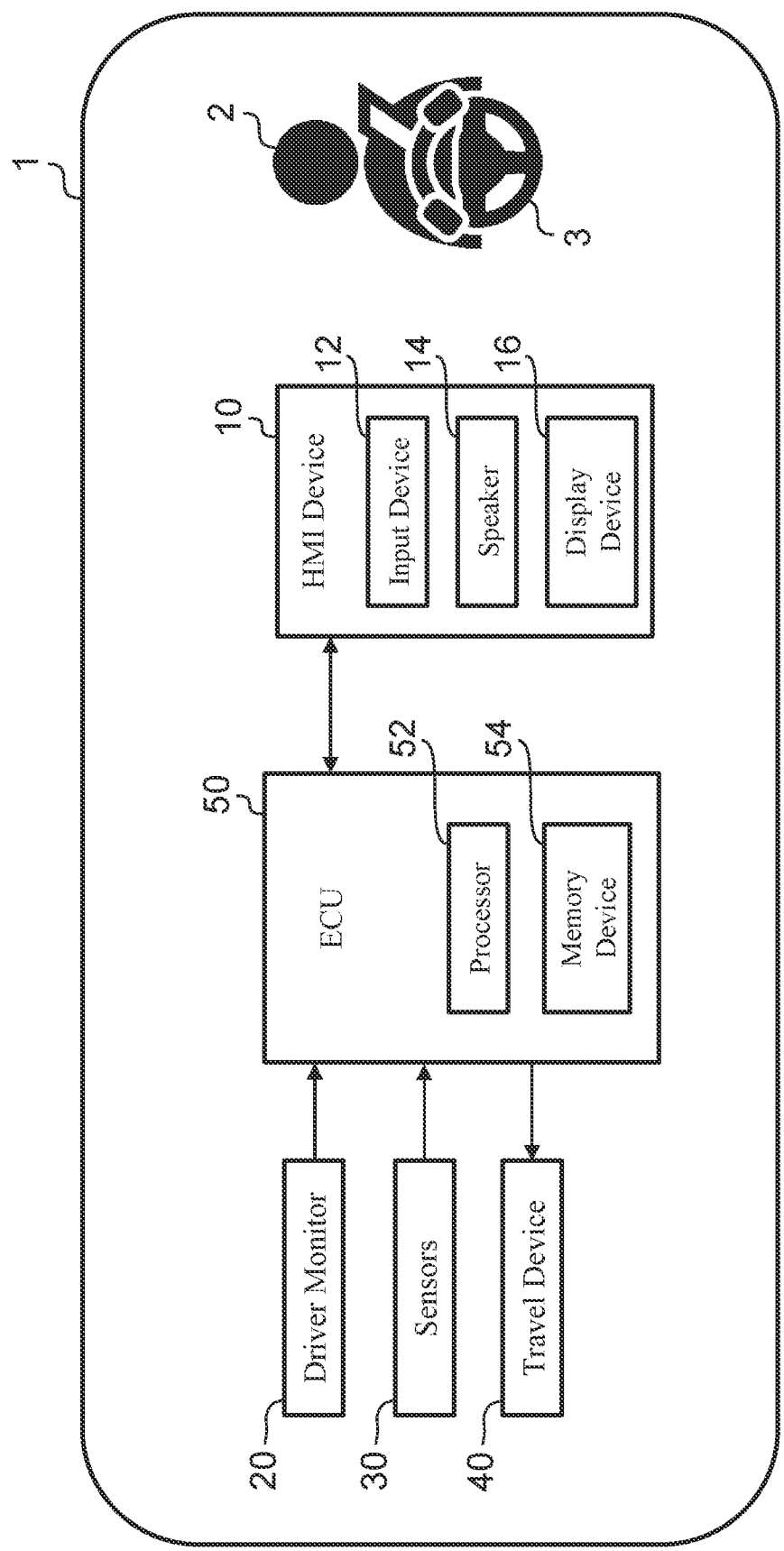
FIG. 1 is a diagram schematically illustrating an example of a configuration of an automated driving vehicle to which a vehicle notification device according to an embodiment is applied.

FIG. 1 is a diagram schematically illustrating an example of a configuration of an automated driving vehicle 1 to which a vehicle notification device according to an embodiment is applied. The automated driving vehicle 1 is configured to be able to perform automated driving at level 3 defined by the American Society of Automotive Engineers (SAE). That is, the vehicle 1 has a hands-off function and an eyes-off function. It should be noted that, in the following description, the automated driving at level 3 is also simply referred to the automated driving.

For example, the vehicle 1 includes a human machine interface (HMI) device 10, a driver monitor 20, sensors 30, a travel device 40, and an electronic control unit (ECU) 50.

The HMI device 10 is configured to provide information to the driver 2 of the vehicle 1 and receive information from the driver 2. For example, the HMI device 10 includes an input device 12, a speaker 14, and a display device 16. The input device 12 is, for example, a touch panel or a switch. The driver 2 can use the input device 12 to input information, such as a destination, and switch ON/OFF of vehicle traveling by the automated driving at level 3. Each piece of information from the driver 2 via the input device 12 is transmitted to the ECU 50. The speaker 14 provides audio information to the driver 2. The display device 16 provides visual information to the driver 2. For example, the display device 16 is a head up display (HUD), a multi information display (MID), or a meter panel. At least a part of the HMI device 10 may not necessarily be mounted on the vehicle 1, and may include, for example, a mobile terminal (for example, a smartphone or a tablet terminal) operated by the driver 2.

The driver monitor 20 includes, for example, a camera installed in the interior of the vehicle 1 to capture an image of the driver 2. By analyzing the image obtained by the camera, it is possible to identify the driver 2 (individual), and detect the state and action of the driver 2, such as the direction of the face, the line of sight, and the degree of eye opening. Therefore, the driver monitor 20 can be used to detect eyes on or eyes off of the driver 2. Furthermore, the driver monitor 20 includes, for example, a steering touch sensor installed on a steering wheel 3 operated by the driver 2. Therefore, hands-on or hands-off of the driver 2 can be detected. The information acquired by the driver monitor 20 is transmitted to the ECU 50.

The sensors 30 include, for example, a recognition sensor, a vehicle state sensor, and a position sensor. The recognition sensor recognizes (detects) a situation around the vehicle 1. The recognition sensor includes, for example, a camera, a laser imaging detection and ranging (LIDAR), and/or a radar. The vehicle state sensor detects a state of the vehicle 1. The vehicle state sensor includes, for example, a speed sensor, an acceleration sensor, a yaw rate sensor, a steering angle sensor, an accelerator pedal sensor, and a brake pedal sensor. The position sensor detects a position and a direction of the vehicle 1. For example, the position sensor includes a global navigation satellite system (GNSS) receiver. Furthermore, the sensors 30 include, for example, a sensor that detects wearing of a seat belt by the driver 2 and a sensor that detects a seating position and a seating posture of the driver 2.

The travel device 40 includes a steering device, a drive device, and a brake device. The steering device steers wheels of the vehicle 1. For example, the steering device includes an electric power steering (EPS) device. The drive device is a power source that generates a driving force. For example, the drive device includes at least one of an internal combustion engine and an electric motor. The brake device generates a braking force.

The ECU 50 is a computer configured to control the vehicles 1. The ECU 50 includes one or more processors 52 (hereinafter, simply referred to as processor 52) and one or more memory devices 54 (hereinafter, simply referred to as memory device 54). The processor 52 executes various processes. The various processes include processes related to automated driving control and a "notification process" described below. For example, the processor 52 includes a central processing unit (CPU). The memory device 54 stores various kinds of information. The memory device 54 include, for example, a volatile memory, a non-volatile memory, a hard disk drive (HDD), and/or a solid state drive (SSD). In addition, the ECU 50 may be configured by combining a plurality of ECUs.

When the processor 52 executes computer programs, various processes by the ECU 50 are realized. The computer programs are stored in the memory device 54. Alternatively, the computer programs may be recorded on a computer-readable recording medium.

The ECU 50 acquires driving environment information indicating the driving environment of the vehicle 1 by using the sensors 30. The driving environment information is stored in the memory device 54. Specifically, the driving environment information includes surrounding situation information indicating a result of recognition by the recognition sensor. For example, the surrounding situation information includes an image captured by the camera and object information on an object around the vehicle 1. Also, the driving environment information includes vehicle state information indicating a vehicle state detected by the vehicle state sensor. Moreover, the driving environment information includes vehicle position information indicating a position and a direction of the vehicle 1. The vehicle position information is obtained by, for example, the position sensor. Furthermore, the driving environment information includes information obtained by the driver monitor 20.

The ECU 50 executes vehicle traveling control for controlling the traveling of the vehicle 1. The vehicle traveling control includes steering control, drive control, and brake control. The ECU 50 executes the vehicle traveling control by controlling the travel device 40 (the steering device, the drive device, and the brake device). Also, the ECU 50 performs the automated driving control based on the driving environment information. For example, the ECU 50 generates a travel plan of the vehicle 1 based on the driving environment information. Further, the ECU 50 generates a target trajectory necessary for the vehicle 1 to travel in accordance with the travel plan, based on the driving environment information. The target trajectory includes a target position and a target velocity. The ECU 50 performs the vehicle traveling control such that the vehicle 1 follows the target trajectory.

2. Notification Process

According to the automated driving at level 3, it is possible to perform not only the hands-off in which a hand is removed from the steering wheel 3 but also the eyes-off in which a line of sight is deviated from the front of the vehicle 1. The driver 2, who is released from the driving operation by being able to perform the eyes-off, is allowed to perform a secondary activity (for example, operating a mobile terminal or watching a video) which is an action other than the driving operation while the vehicle 1 is traveling. However, in order to realize the allowance for the second activity, it is necessary for the driver 2 to satisfy a driving change request (TD: transition demand). More specifically, the driving change request is issued when the system of the vehicle 1 falls into a situation (for example, out of the range of an operational design domain (ODD), bad weather, or a system failure) that cannot be handled during the automated driving.

The system of the vehicle 1 is required to always recognize that the driver 2 can return to the driving operation before a specified time (for example, a specified time T4 described below) elapses after a driving change request is issued, and to maintain a state (driving preparation state) in which the driver 2 is ready to return to the driving operation as described above.

In order to be able to constantly monitor the state and action of the driver 2 by using the driver monitor 20 during the automated driving for the purpose of maintaining the above described driving preparation state (readiness), it may be necessary to limit one or more secondary activities that are difficult to monitor (for example, reading, operating a smartphone, eating, or using a personal computer (PC)). On the other hand, if an attempt is made to eliminate the blind spot in order to enlarge the secondary activity, it may be necessary to acquire camera images from various angles for driver monitoring. This leads to an increase in vehicle costs.

Moreover, it is desirable to prompt the driver 2 to improve the driving characteristics by causing the driver 2 to maintain the driving preparation state.

In view of the issue described above, in the present embodiment, the ECU 50 (processor 52) executes the following "notification process". That is, in the notification process, the ECU 50 notifies the driver 2 of a hands-on request and an eyes-on request every time a notification interval (more specifically, a notification time interval) T1 elapses. To be more specific, this notification requests the driver 2 that the hands-on and the eyes-on are performed within the specified time (for example, specified time T4). Also, this notification interval T1 is calculated based on driving characteristic information of the driver 2. More specifically, the notification interval T1 is changed in accordance with the driving characteristic information.

Figure 2:
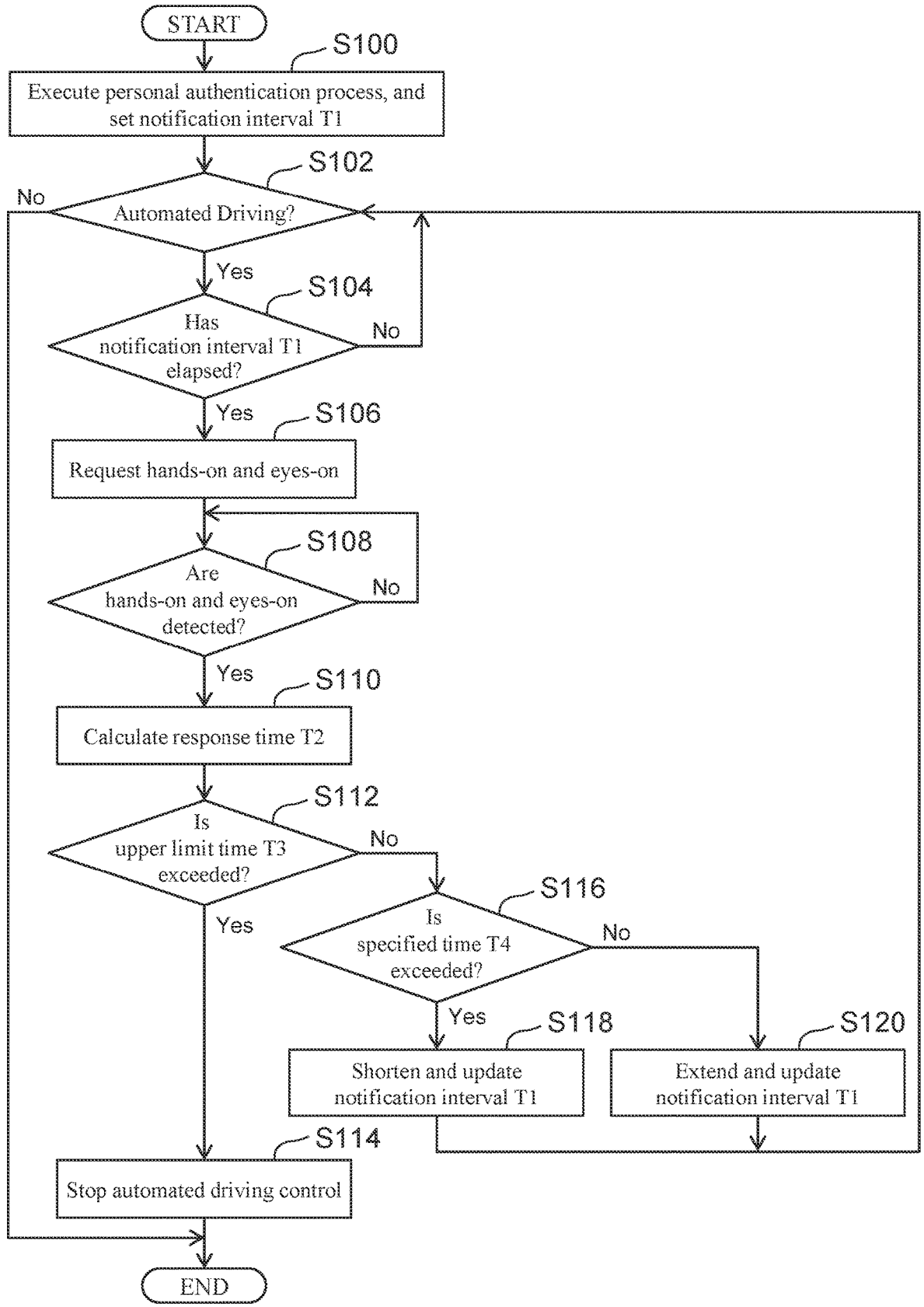
FIG. 2 is a flowchart illustrating an example of processing related to a notification process according to the embodiment.

FIG. 2 is a flowchart illustrating an example of processing related to the notification process according to the embodiment. The processing of this flowchart is started when, for example, the condition of executing the automated driving control at level 3 is satisfied.

In step S100, the ECU 50 (processor 52) executes a personal authentication process using the driver monitor 20 in order to identify the driver 2. Further, the ECU 50 sets (calculates) the notification interval T1. The notification interval T1 corresponds to a time interval for repeatedly confirming that the driving preparation state of the driver 2 is maintained during the automated driving. More specifically, the notification interval T1 corresponds to a predicted value (i.e., an estimated value) of the time from the start of the hands-off and the eyes-off to when deterioration of the driving preparation state begins to occur.

The calculation of the notification interval T1 in step S100 is executed as follows, for example. That is, the notification interval T1 is calculated by multiplying a basic value T1$b$ by a correction coefficient K as shown in Equation (1). As the basic value T1$b$, for example, a predetermined value (for example, 3 minutes) is used. The correction coefficient K is determined based on response time T2 of the driver 2 and driver information DI of the driver 2. More specifically, the correction coefficient K is, for example, a product of a correction coefficient K1 based on the response time T2 and a correction coefficient K2 based on the driver information DI as shown in Equation (2).

$$T1 = T1b \cdot K \quad (1)$$

$$K = K1 \cdot K2 \quad (2)$$

The response time T2 corresponds to a time from the start of the hands-on request and eyes-on request to the detection of both the hands-on and eyes-on. For example, average response time T2$m$ is used to calculate the correction coefficient K1. The average response time T2$m$ is an average value of response times T2 measured for the driver 2 a predetermined number of times in the past. More specifically, the average response time T2$m$ may be, for example, a moving average value of the response time T2 measured a predetermined number of times most recently.

Further, the correction coefficient K1 is calculated, for example, as a value according to the reciprocal of the average response time T2$m$. More specifically, when the average response time T2$m$ is equal to the specified time T4 described below, the correction coefficient K1 is set to 1. When the average response time T2$m$ is shorter than the specified time T4, the correction coefficient K1 is calculated, within a range greater than 1, so as to be greater when the average response time T2$m$ becomes shorter. On the other hand, when the average response time T2$m$ is longer than the specified time T4, the correction coefficient K1 is calculated, within a range that is equal to or greater than 0 and less than 1, so as to be smaller when the average response time T2$m$ becomes longer. In addition, in order to calculate the correction coefficient K1, for example, the value of the response time T2$m$ measured most recently may be used instead of the average response time T2.

The driver information DI related to the calculation of the correction coefficient K2 includes the driving characteristic information of the driver 2. The driving characteristic information includes, for example, information on dangerous driving of the driver 2. This information includes, for example, the number of emergency brake actuations performed automatically by the brake device of the vehicle 1. Also, the information includes, for example, the number of rapid acceleration, rapid deceleration, rapid steering, meandering traveling, and traveling the shoulder of a road by the driver 2. Further, the information includes the number of violation acts related to the driving support function during traveling of the vehicle 1 in which the automated driving function at level 3 is not used. The violation acts are, for example, that the driver 2 releases his or her hands from the steering wheel 3 while using the driving support function, such as adaptive cruise control (ACC). Various types of driving characteristic information as described above are acquired using, for example, the sensors 30 and the driver monitor 20 during the vehicle traveling in which the automated driving function at level 3 is not used, and are stored in the memory device 54.

For example, the correction coefficient K2 is set to 1 or a predetermined value greater than 1 when there is no history of the dangerous driving described above. Then, the correction coefficient K2 is calculated so as to become smaller toward 0 when the number of each of the above-described dangerous driving actions is greater. In addition, the reduction amount of the correction coefficient K2 for one dangerous driving may be changed in accordance with the contents of each dangerous driving action.

Moreover, the driver information DI may include driving-related information, such as the number of times the driver 2 looks aside and the number of times the driver 2 closes his or her eyes, in addition to the vehicle characteristic information described above. Then, for example, the correction coefficient K2 may be calculated so as to become smaller toward 0 when the number of each of looking aside and eye-closing is greater. The driver information DI may also include personal information (for example, age) of the driver 2. For example, the correction coefficient K2 may be calculated so as to be greater when the age is younger. Furthermore, the driver information DI may include, as a history of the response time T2, a probability that the response time T2 falls within the specified time T4. When the probability is higher than a threshold value, the correction coefficient K2 may be corrected so as to increase within a range greater than 1.

The notification interval T1 calculated in this step S100 as described above is stored in the memory device 54. In addition, when the data regarding the response time T2 and the driver information DI is not stored in the memory device 54, an initial value determined in advance may be used as the notification interval T1.

In step S102 subsequent to step S100, the ECU 50 determines whether or not the automated driving (automated driving control) is being executed. As a result, when the automated driving is being executed (step S102; Yes), the processing proceeds to step S104. On the other hand, when the automated driving is not being executed (step S102; No), the processing of this flowchart ends.

In step S104, the ECU 50 determines whether or not the notification interval T1, which starts from the start time point of the automated driving or a time point at which the previous notification interval T1 has elapsed, has elapsed. As a result, when the notification interval T1 has elapsed (step S104; Yes), the processing proceeds to step S106. On the other hand, when the notification interval T1 has not elapsed (step S104; No), the processing returns to step S102.

In step S106, the ECU 50 notifies the driver 2 of a hands-on request and an eyes-on request by using the HMI device 10. That is, the ECU 50 executes the notification process described above. Examples of the method of requesting the hands-on and the eyes-on include a request by voice using the speaker 14, display of a request on a screen of the display device 16, a request by vibration of the seat belt, and a request by sound and a message using a mobile terminal of the driver 2.

In step S108 subsequent to step S106, the ECU 50 determines whether or not both the hands-on and eyes-on of the driver 2 in response to the hands-on request and eyes-on request are detected. As a result, when both the hands-on and eyes-on are detected (step S108; Yes), the processing proceeds to step S110. In addition, when one or both of the hands-on and the eyes-on are not detected before a designated time longer than an upper limit time T3 described below elapses from the start of the request for the hands-on and the eyes-on, the processing may proceed to step S114.

In step S110, the ECU 50 calculates the response time T2 for the hands-on and eyes-on requests by the processing in step S106. The response time T2 is calculated as, for example, the average response time T2$m$ described above. The calculated response time T2 is stored in the memory device 54.

In step S112 subsequent to step S110, the ECU 50 determines whether or not the calculated response time T2 is longer than the upper limit time T3 (for example, 10 seconds). As a result, when the response time T2 exceeds the upper limit time T3 (step S112; Yes), the processing proceeds to step S114.

In step S114, the ECU 50 stops the automated driving control. That is, as a penalty for the driver 2 not performing the hands-on and the eyes-on within the upper limit time T3, the use of the automated driving function at level 3 is restricted. More specifically, for example, the stop of the automated driving control is notified to the driver 2 in advance by using the HMI device 10. Then, the automated driving control is stopped. Alternatively, first, a notification (alert) indicating that the automated driving control will be stopped unless the hands-on and the eyes-on are performed may be performed after the upper limit time T3 elapses. Then, if the hands-on and the eyes-on are not performed despite such an alert, the automated driving control may be stopped. The cancellation of the stop of the automated driving control is performed when, for example, the system of the vehicle 1 is turned OFF (that is, when the ignition is turned OFF).

On the other hand, when the response time T2 is within the upper limit time T3 (step S112; No), the processing proceeds to step S116. In step S116, the ECU 50 determines whether or not the response time T2 calculated in step S110 is longer than the specified time T4 (i.e., a determination threshold value). The driver 2 is requested by the system of the vehicle 1 to perform the hands-on and the eyes-on such that the response time T2 becomes less than or equal to the specified time T4 (for example, 4 seconds).

When the response time T2 exceeds the specified time T4 (step S116; Yes), the processing proceeds to step S118. In step S118, the ECU 50 shortens and updates the notification interval T1. More specifically, the notification interval T1 is shortened by, for example, subtracting a designated correction time ΔT1 from the current value. The notification interval T1 updated in step S118 is stored in the memory device 54.

On the other hand, when the response time T2 is shorter than the specified time T4 (step S116; No), the processing proceeds to step S120. In step S120, the ECU 50 extends and updates the notification interval T1. More specifically, the notification interval T1 is extended by adding a designated correction time ΔT2 to the current value, for example. The notification interval T1 updated in step S120 is stored in the memory device 54. The correction time ΔT1 and the correction time ΔT2 may be the same or may be different. In addition, when the response time T2 is equal to the specified time T4, the notification interval T1 is maintained at the current value. Also, when the response time T2 is substantially equal to the specified time T4, the notification interval T1 may be maintained at the current value.

The processing of steps S118 and S120 will be further supplemented. When the processing proceeds to step S118 or S120 for the first time after the start of the processing of the flowchart shown in FIG. 2, the notification interval T1 set in step S100 corresponds to the "current value" of the notification interval T1 mentioned here. On the other hand, when the processing proceeds to step S118 or S120 for the second or subsequent time after the start of the processing of this flowchart, the value of the notification interval T1 updated by the processing of the most recent step S118 or S120 (that is, the previous value) corresponds to the "current value".

3. Effect

As described above, according to the present embodiment, the hands-on request and the eyes-on request are notified to the driver 2 every time the notification interval T1 elapses. The notification interval T1 is calculated based on the driving characteristic information of the driver 2. Accordingly, it is possible to appropriately continue the driving preparation state using the notification interval T1 based on the driving characteristic information without constantly monitoring the driver 2 during the automated driving using a monitoring device, such as the driver monitor 20.

Moreover, the driver 2 knows in advance that the notification interval T1 is calculated based on the driving characteristic information of the driver 2. For this reason, the driver 2 can understand that the improvement of the driving characteristics, such as the execution of the safe driving, leads to the extension of the notification interval T1, that is, the improvement of the convenience of the automated driving (for example, the expansion of the flexibility of the secondary activity and the expansion of the eyes-off time). Therefore, by changing the notification interval T1 in accordance with the driving characteristic information, it is possible to prompt the driver 2 to improve the driving characteristics in order to extend the notification interval T1.

Further, if the driving preparation state can be appropriately maintained by the method of the present embodiment, the driver 2 can quickly return to the driving operation even when a sudden driving change request occurs. This contributes to safe vehicle traveling by the automated driving at level 3. Also, various secondary activities (for example, reading, operating a smartphone, eating, or using a PC) can be provided to the driver 2. Further, since it is not necessary to always monitor the driver 2 during the automated driving, the vehicle cost required for monitoring can be reduced.

Moreover, in the present embodiment, the driving characteristic information includes the information on the dangerous driving of the driver 2. Then, when there is a history of the dangerous driving, the ECU 50 shortens the notification interval T1 compared to when there is no history (see step S100). As a result, it is possible to appropriately maintain the driving preparation state while prompting the driver 2 to improve the driving characteristics such that the driver 2 can drive more safely.

Furthermore, in the present embodiment, the notification interval T1 is shortened when the response time T2 (for example, the average response time T2*m*) is longer than the specified time T4 (determination threshold value), and the notification interval T1 is extended when the response time T2 is shorter than the specified time T4 (see steps S100 and S116 to S120). The driver 2 knows in advance that the notification interval T1 is changed in accordance with the specified time T4 in this way. Therefore, the driver 2 can understand that the shortening of the response time T2 leads to the extension of the notification interval T1, that is, the improvement of the convenience of the automated driving. Therefore, according to the present embodiment, by increasing or decreasing the notification interval T1 in accordance with the response time T2 of the driver 2 as described above, it is possible to always make the driver 2 aware that the driver 2 should return to the driving operation within the specified time T4. Therefore, the driving preparation state can be favorably maintained without constantly monitoring the driver 2 during the automated driving. In addition, limiting the use of the automated driving when the response time T2 exceeds the upper limit time T3 (see steps S112 and S114) also leads to making the driver 2 aware that the driver 2 should quickly return to the driving operation in response to the hands-on and eyes-on requests.

4. Another Example of Notification Process

In the notification process according to the embodiment described above, both the hands-on request and the eyes-on request are notified to the driver 2 in order to maintain the driving preparation state of the driver 2. Instead of this example, the notification process may be executed as follows.

Figure 3:
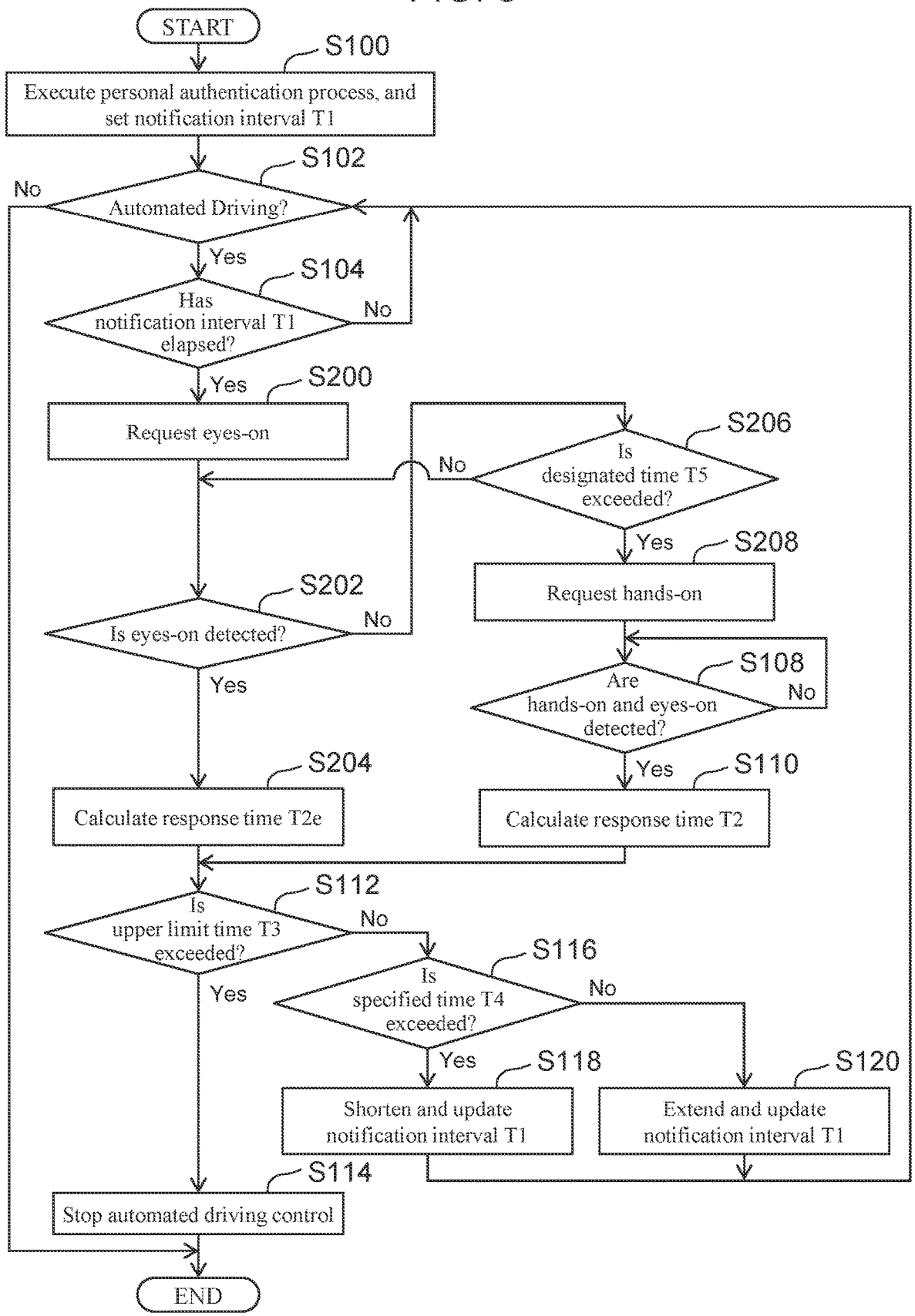
FIG. 3 is a flowchart illustrating another example of processing related to the notification process according to the embodiment.

FIG. 3 is a flowchart illustrating another example of processing related to the notification process according to the embodiment. Differences between the processing of the flowchart shown in FIG. 2 and the processing of this flowchart will be described below.

In FIG. 3, the processing proceeds to step S200 after step S104. In step S200, the ECU 50 uses the HMI device 10 to notify the driver 2 of only the eyes-on request.

In step S202 subsequent to step S200, the ECU 50 determines whether or not the eyes-on of the driver 2 in response to the eyes-on request is detected. As a result, when the eyes-on is detected (step S202; Yes), the ECU 50 calculates, in step S204, a response time T2*e* for the eyes-on request. The calculated response time T2*e* is stored in the memory device 54. Thereafter, the processing proceeds to step S112. As a result, the response time T2*e* is used in the determination of steps S112 and S116.

On the other hand, when the eyes-on request is not detected (step S202; No), the ECU 50 determines, in step S206, whether or not a designated time T5 from the eyes-on request has elapsed. For example, the designated time T5 is set to be longer than the specified time T4 and shorter than the upper limit time T3. When the designated time T5 has not elapsed (step S206; No), the processing returns to step S202.

On the other hand, when the designated time T5 has elapsed without the eyes-on being detected (step S206; Yes), the processing proceeds to step S208. In step S208, the ECU 50 notifies the driver 2 of the hands-on request by using the HMI device 10. Thereafter, the processing proceeds to step S108.

According to the processing shown in FIG. 3 described above, when it can be confirmed that the driver 2 is conscious by performing the eyes-on in response to the notification of the eyes-on request, the hands-on request is not performed. Accordingly, it is possible to appropriately maintain the driving preparation state while further improving the convenience of the driver 2.

The invention claimed is:

1. A vehicle notification device applied to an automated driving vehicle, the vehicle notification device comprising one or more processors,
   the one or more processors being configured to:
   determine a notification interval by multiplying a basic value by a correction coefficient based on a response time of a driver;
   determine whether automated driving is being executed;
   upon determination that automated driving is being executed, determine whether the notification interval has elapsed;
   upon determination that the notification interval has elapsed, notify the driver of a hands-on request and an eyes-on request;
   after notifying the driver of the hands-on request and the eyes-on request, determine whether both a hands-on and eyes-on of the driver are detected;
   upon determination that both the hands-on and the eyes-on of the driver are detected, determine a response time for the hands-on and the eyes-on;
   determine whether the response time exceeds a predetermined threshold; and
   upon determination that the response time exceeds the predetermined threshold, stop the automated driving.

2. The vehicle notification device according to claim 1, wherein
   when there is a history of dangerous driving by the driver, the one or more processors shorten the notification interval compared to when there is no history of the dangerous driving.

3. The vehicle notification device according to claim 1, wherein
   the one or more processors is configured to shorten the notification interval when time from a notification of the hands-on request and the eyes-on request to a response, to the notification, of the hands-on request and the eyes-on request is longer than a determination threshold value.

4. The vehicle notification device according to claim 1, wherein
   the one or more processors is configured to extend the notification interval when time from a notification of the hands-on request and the eyes-on request to a response, to the notification, of the hands-on request and the eyes-on request is shorter than a determination threshold value.

* * * * *